United States Patent [19]

Pfenninger et al.

[11] Patent Number: 5,025,041

[45] Date of Patent: Jun. 18, 1991

[54] PEARLESCENT COATING COMPOSITIONS

[75] Inventor: Johannes Pfenninger; Edward E. Jaffe, both of Wilmington, Del.

[73] Assignee: Ciba-Geigy Corporation, Ardsley, N.Y.

[21] Appl. No.: 366,900

[22] Filed: Jun. 15, 1989

[51] Int. Cl.$^5$ .................... C09D 5/36; C09D 133/08; C08K 5/23
[52] U.S. Cl. .................... 523/171; 523/216; 524/190; 524/431; 524/449; 524/168
[58] Field of Search .................... 523/171, 216

[56] References Cited

U.S. PATENT DOCUMENTS 4,267,229  5/1981  Knight .................... 523/171
4,551,491  11/1985  Panush .................... 523/171

*Primary Examiner*—C. Warren Ivy
*Attorney, Agent, or Firm*—Harry Falber

[57] ABSTRACT

Pearlescent coating compositions comprising a resin binder system, coated mica particles and a manganese salt of an azo pigment, these coating compositions being of particular value in two coat automotive paint systems wherein the pearlescent composition is applied as the base coat which is covered with a clear top coat to provide paint systems with intense color, high pearlescence and excellent durability.

11 Claims, No Drawings

PEARLESCENT COATING COMPOSITIONS

The present invention relates to a pearlescent coating composition comprising a resin binder system, coated mica particles and a manganese salt of an azo pigment, these coating compositions being of particular value in two coat automotive paint systems wherein the pearlescent composition is applied as the base coat which is covered with a clear top coat to provide paint systems with intense color, high pearlescence and excellent durability.

Two coat paint systems are becoming increasingly more important in the coatings industry, mainly in automotive paint application. They are usually based on acrylic, polyester or polyurethane type binders. These paint systems generally consist of a pigmented base coat and a clear top coat containing stabilizers, e.g. UV absorbers and hindered amine light stabilizers. The two coat technology is used in the automotive industry for both opaque and metallic type finishes, but particularly the latter.

Two coat systems have some important technical advantages, as environmental regulations require lower solvent emissions at automotive paint facilities, making high solids paints progressively more important. It is well known that the presence of pigments in a top coat often adversely affects the gloss and DOI (distinctness of image) or mirror quality of a paint finish, especially at a high solids level (pigment and binder). This problem is largely avoided in two coat systems where only the base coat is pigmented and the clear top coat is responsible for the gloss and mirrorlike appearance of the finish. With the two coat technology, the durability of the finish is improved inasmuch as the pigmented base coat is protected from the atmosphere and UV-light by a clear coat containing stabilizers.

Metallic or pearlescent effects in coatings are achieved by incorporation of flake pigments in the base coat, resulting in geometric metamerism, commonly called two tone effect or "flip-flop". This latter property is of particular aesthetic value and manifests itself as a change in color depth and often hue as a function of the viewing angle. The effect may be observed by slowly rotating a flat paint panel covered with a metallic finish from a normal to an obtuse angle. With increasing two tone the color increases in depth as the viewing angle changes in any direction from normal.

Commonly used flake pigments are e.g. aluminum flakes or mica particles coated with titanium dioxide or iron oxide. Aluminum imparts some greyness and dullness to the coating and is therefore increasingly substituted with mica. The coated mica flakes yield a brighter and more intense finish, but cause enormous gloss problems in one coat systems due to their size which is generally between 5 and 50 microns. In two coat systems, however, excellent gloss is achieved with the application of the clear top coat, while the desired brightness is retained.

It is an object of the invention to provide improved coating compositions and coated substrate materials showing pearlescent effects and high durability.

The pearlescent coating composition of the invention comprises a resin binder system, coated mica particles and a manganese salt of an azo pigment.

The azo pigment may be one of the conventional pigments available in the form of its manganese salt. Examples of such pigments are compounds having two carboxylic acid functional groups, for example those obtained on coupling diazotized anthranilic acid or a diazotized substituted anthranilic acid with an optionally substituted amino- or hydroxy-naphthoic acid. Preferred is a manganese salt of an azo pigment of the formula

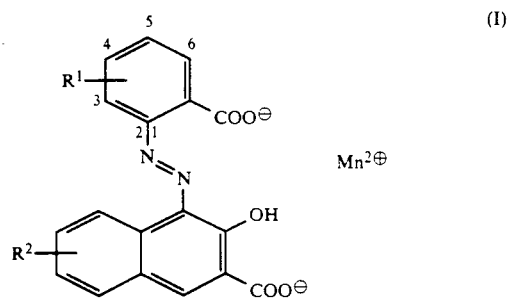

wherein $R^1$ and $R^2$, independent of each other, are hydrogen, $C_1$–$C_4$-alkyl, $C_1$–$C_4$-alkoxy, halogen, nitro, cyano, $C_1$–$C_4$-alkoxycarbonyl, carbamoyl or sulfamoyl.

$C_1$–$C_4$-alkyl is e.g. methyl, ethyl or isopropyl, preferably methyl. $C_1$–$C_4$-alkoxy is e.g. methoxy or ethoxy, preferably methoxy. Halogen is e.g. fluorine, chlorine, bromine or iodine, preferably chlorine. $C_1$–$C_4$-alkoxycarbonyl is preferably methoxycarbonyl.

The substituent $R^1$ may be located in any position on the benzene ring, for example in the 3-, 4-, 5- or 6-position, preferably in the 4-position para to the carboxyl function. The substituent $R^2$ may be located in any position on the naphthalene ring, for example in the 4-, 5-, 6-, 7- or 8-position, preferably in the 6- or 7-position.

Preferred are compounds of the formula I wherein $R^1$ is located in the 4-position and has one of the mentioned meanings and $R^2$ is hydrogen.

Most preferred are compounds of the formula I wherein $R^1$ is located in the 4-position and is chloro or nitro and $R^2$ is hydrogen, particularly the compound wherein $R^1$ is 4-chloro and $R^2$ is hydrogen (C.I. Pigment Red 55 manganese salt). These compounds yield attractive red to maroon shades.

Compounds of formula I wherein $R^1$ is located in the 4-position and is halogen or nitro and $R^2$ is hydrogen and their preparation are known and described, for example, in U.S. Pat. No. 2,649,383. C.I. Pigment Red 55 manganese salt can be prepared in a highly transparent form having an intense maroon color, making it an excellent candidate for metallic applications. However, due to its poor durability in combination with aluminum flakes, the pigment has become obsolete in recent years.

Novel compounds of formula I not hitherto disclosed can be prepared using the appropriate starting materials and a process analogous to the one disclosed in U.S. Pat. No. 2,649,383.

The pearlescent coating composition of the invention may contain a further pigment known in the art in addition to the described manganese salt of an azo pigment. Examples of such further pigments are iron oxides, titanium dioxide or organic pigments with good durability.

The coated mica particles according to the present invention are mica particles coated with metallic oxides, for example titanium dioxide, iron oxides or mixture thereof, optionally further including additives of chromium oxides and of other high temperature stable metal oxides, e.g. oxides of copper, calcium, cadmium, cobalt, barium, strontium, manganese, magnesium, tin and lithium. The metallic oxide coating is generally in the molecular range of thickness representing about 10% to about 60% of total weight. Preferred mica particles are those coated with iron oxide and/or titanium dioxide, optionally in combination with small amounts of other oxides, for example chromium oxide, which range in color from light silver to bronze to copper to red. The coated mica particles are optically pearlescent because their transparency permits some light to pass through the particles resulting in a multiplicity of reflections causing interference colors. The coated mica particles and their preparation are known and are described, for example, in U.S. Pat. Nos. 3,087,828 and 3,874,890.

The coated mica particles are preferably of controlled and substantially uniform size within about 5 microns to about 50 microns in their largest dimension and about 0.25 microns to about 1 micron in thickness, i.e. in the form of flakes. Preferred mica particles of the mentioned dimensions coated with iron oxide and small amounts of titanium dioxide and chromium oxide are available commercially, for example from Mearle Corporation.

The resin binder system according to the present invention is any suitable film forming resin conventionally used in two coat paint systems. Examples are acrylic, alkyd, polyurethane, polyester and aminoplast resins used in dissolved or dispersed form in suitable solvents. The solvent may be aqueous or organic. The preferred organic solvents are, for example, an aliphatic, cycloaliphatic or aromatic hydrocarbon, an ester, an ether, a ketone or an alcohol or mixtures thereof, and optionally further a non-volatile cellulose ester or wax compatible with the resin, for example cellulose nitrate, cellulose propionate, cellulose acetate or the like, or mixtures thereof.

Preferred resins in the resin binder system are acrylic resins, for example homopolymers of methyl methacrylate or copolymers of methyl methacrylate with acrylic acid, methacrylic acid, $C_1$–$C_4$-alkyl acrylates, $C_2$–$C_4$-alkyl methacrylates, vinyl acetate, acrylonitrile, styrene or the like, or with mixtures thereof.

In coating compositions of the invention comprising the described resin binder system, coated mica particles and the manganese of an azo pigment, total solids usually range from about 10% to about 80%, preferably from about 30% to about 60%, in particular from about 45% to about 55%, the remainder being solvent.

Preferred coating compositions of the present invention comprise about 0.2% to about 10% by weight, in particular about 0.5% to about 5%, of coated mica particles as described above, and about 1% to about 10% by weight, in particular about 2% to about 7%, of a compound of formula I as described hereinbefore. In such compositions, total solids usually range from about 30% to about 60% by weight. Preferably the weight ratio of coated mica particles to the compound of formula I ranges between about 1:9 and about 7:3, for example about 3:7.

Most preferred is a coating composition comprising an acrylic resin binder, about 1% to about 5% by weight of iron oxide coated mica particles, and about 2% to about 7% by weight of a compound of formula I wherein $R^1$ is 4-chloro or 4-nitro and $R^2$ is hydrogen. In such compositions, total solids preferably range from about 45% to about 55% by weight.

In another aspect, the invention comprises a substrate material coated with at least one layer of a pearlescent coating composition as described hereinbefore and at least one layer of a clear top coat composition.

The substrate material considered by the present invention may be a metallic material, for example steel, aluminum, copper, magnesium, or alloys thereof, glass, ceramics, or organic polymers. Preferred materials are those used conventionally in the automotive industry such as metallic material or hard organic polymers. The substrate material may be pretreated in the usual way, for example with corrosion inhibitors, surface modifying agents or base paints.

The substrate material is coated with at least one and preferably two to four layers of the pearlescent coating composition. The total thickness of the single or multiple layers may vary and is, for example, between about 5 and about 60 microns, preferably between about 10 and about 25 microns.

The clear top coat compositions applicable to the invention are those commonly used for two coat paint systems. Such a clear top coat composition provides a transparent film when applied as a layer and guarantees that the attractive effects caused by the pearlescent base coat of the invention can be properly seen.

The clear top coat composition may comprise the same or a similar resin binder system as present in the pearlescent base coat, for example an acrylic, alkyd, polyurethane, polyester or aminoplast resin in dissolved or dispersed form. Acrylic resins are preferred. The clear top coat composition may further comprise stabilizers that protect the underlying base coat and the substrate material against the adverse effects of light, humidity and oxygen. Useful stabilizers are conventional corrosion inhibitors, UV-absorbers, anti-oxidants and the like. Preferred stabilizers are hindered amine light stabilizers, for example those disclosed in U.S. Pat. No. 4,314,933. Preferred UV-absorbers are benzotriazoles, in particular 2-(2'-hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy-, 3',5'-di-tert-amyl derivative of 2-(2'-hydroxyphenyl)-benzotriazole. It is advantageous to use a combination of the preferred hindered amine light stabilizers and the preferred UV-absorbing benzotriazoles.

The substrate material coated with at least one layer of the pearlescent coating composition is then coated with at least one and preferably two to four layers of the clear top coat composition. Preferred is a substrate material coated with one or two layers of an acrylic clear top coat composition, in particular of such a composition comprising a hindered amine light stabilizer. The total thickness of the single or multiple layers of the top coat may vary and is, for example, between about 10 and about 100 microns, preferably about 2 to 3 times the thickness of the pearlescent base coat, for example between about 25 and about 75 microns.

In a further aspect, the invention relates to a method of coating a substrate material comprising applying at least one layer of a pearlescent coating composition as described hereinbefore and at least one layer of a clear top coat composition.

The layers may be applied to the substrate material by any conventional method known in the art, for example by brushing, spraying, dipping, flow coating or the like. Preferably, the layers are applied by spraying, for example compressed air spraying, electrostatic spraying, hot spraying, airless spraying or similar techniques. The thickness of the layer applied is determined by the method as mentioned and the viscosity of the composition applied. The viscosity of the composition is adjusted to the desired value by adding more solvent or more solids.

The coated substrate material may be subjected to brief periods of drying or curing after the application of the individual layers. Such drying may be accomplished by a so-called "flash" at ambient temperature for about 30 seconds to 10 minutes, in particular a "flash" of between 30 seconds and 3 minutes between layers of like composition and between 2 minutes and 10 minutes between the single or final layer of the base coat and the single or first layer of the top coat. Extended drying at ambient or increased temperatures may be envisaged, but limited drying as mentioned is preferable because it provides improved adhesion of the applied layers without extensive mixing, especially mixing between base coat and top coat.

In a preferred embodiment, the invention relates to a method of coating a substrate material comprising the steps of: spraying two layers of a pearlescent coating composition comprising a compound of formula I wherein $R^1$ is 4-chloro and $R^2$ is hydrogen on an optionally precoated substrate material with intermittent flash drying of between 30 seconds and 3 minutes at ambient temperature to a total thickness of between about 10 and about 25 microns; drying between 2 minutes and 10 minutes at ambient temperature; and spraying two layers of a clear top coat composition with intermittent flash drying of between 30 seconds and 3 minutes at ambient temperature to a total thickness of between 25 and about 75 microns.

It has been found that the pearlescent coating compositions of the invention provide paint films with an intense color and high pearlescence in two coat applications. Surprisingly, these paint films show high durability, for example as determined by exposure in a "Weather-o-meter" or on outdoor exposure. A substrate material coated with a pearlescent coating composition comprising the preferred pigment, i.e. the compound of formula I wherein $R^1$ is 4-chloro and $R^2$ is hydrogen, shows particularly excellent durability which clearly exceeds the durability of an otherwise identically coated substrate material wherein the preferred pigment of the invention is replaced by the standard pigment Red 224, perylene tetracarboxylic dianhydride, or of an otherwise identically coated substrate material wherein the coated mica particles are replaced by aluminum flakes or by titanium dioxide particles used in light tints. Similar excellent durability is exhibited by substrate material of the invention containing other pigments described herein.

The following examples further illustrate this invention, but are not to be construed as a limitation thereof. All parts are given by weight unless indicated otherwise.

EXAMPLE I

This example describes the preparation of C.I. Pigment Red 55 (manganese salt), the compound of formula I wherein $R^1$ is 4-chloro and $R^2$ is hydrogen.

A solution is prepared with 35 parts 4-chloroanthranilic acid (98%) dissolved at about 40° C. in a mixture of 400 parts water and 8.8 parts sodium hydroxide. The solution is cooled to 4° C. by addition of ice, and 13.87 parts sodium nitrite dissolved in about 50 parts water are slowly added. After stirring for 10 minutes the above solution is added over 15 minutes to a mixture of 200 parts water and 99 parts concentrated hydrochloric acid at 8° C. The solution is maintained at 9 to 11° C. for 30 minutes whereupon 2 parts activated carbon powder are added and the mixture is clarified by filtration through Celite (Manville Prod. Corp.).

A further solution is prepared with 38.4 parts 2-hydroxy-3-naphthoic acid (98%) dissolved in 400 parts water containing 35 parts sodium hydroxide. To the solution are added 31.8 parts sodium carbonate, and after complete solution the temperature is adjusted with ice to 8° C. The initially prepared diazo solution is then added over about 50 minutes maintaining the temperature at 7 to 9° C. The resulting slurry is stirred for 15 minutes and the pH is adjusted to 9.4 with concentrated hydrochloric acid. After an additional 15 minutes at 10 to 12° C., the slurry is heated to 45° C. over 30 minutes, maintained at that temperature for 5 minutes, filtered and washed with a 5% sodium chloride solution.

The resulting presscake is reslurried in 2500 parts water and treated with 4.8 parts Trisulphoil-Soap D (Scholler, Philadelphia) in 40 parts water and 7.8 parts sodium acetate in 40 parts water, followed by adjustment of the suspension pH to 8.8 with 5% sodium hydroxide solution. The slurry is maintained at a temperature of 27° C. whereupon a solution of 67.6 parts manganese sulfate monohydrate in 320 parts water is added over a period of 7 minutes. After addition of 5% sodium hydroxide to a pH of 8.2, the slurry is heated over 65 minutes to 95° C. Ice and water are added to lower the temperature to 65° C., the pigment is filtered, washed with warm water and dried at 60° C. The yield is 87.7 parts.

Using 4-nitro-anthranilic acid in place of 4-chloroanthranilic acid, the compound of formula I wherein $R^1$ is 4-nitro and $R^2$ is hydrogen is obtained. Additional pigments with different substitution patterns in the diazo base can be prepared in a similar fashion.

EXAMPLE II

This example describes the application of the pigment of Example I in a pearl styling in an acrylic base coat/clear top coat paint system.

A mixture of 39.6 parts of the pigment of Example I, 116.5 parts acrylic dispersion resin and 173.9 parts solvent is milled in a laboratory size ball mill for 64 hours to prepare the pigment base. The pearl base is prepared by hand mixing 72 parts coated mica flakes (Exterior Brite Bronze No. 249X, 31–37% $Fe_2O_3$, 2–4% $TiO_2$, 0.3–0.9% $Cr(OH)_3$; or Exterior Russet No. 449X, 46–52% $Fe_2O_3$, 2–4% $TiO_2$, 0.3–0.9% $Cr(OH)_3$; from Mearle Corp.) with 211.8 parts acrylic dispersion resin and 116.2 parts solvent. The pigment base (53.6 parts) is blended with 15.3 parts of the pearl base and 81.1 parts additional resin solution (52.8% solids by weight) and let down to a spray viscosity of 21–23 seconds in a No. 2 Fisher Cup to yield the final base coat paint with a 70:30 (by weight) color/pearl composition.

Aluminum panels treated with a grey acrylic primer are sprayed with two coats of the base coat paint to a film thickness of 15–20 microns on a dry film basis. The two sprayings are spaced by a 90 second flash at room temperature. After a flash of 3 minutes, the acrylic clear top coat is applied by spraying two coats (90 second flash between coats) to a film thickness of 37–50 microns on a dry film basis. The panels are dried for 10 minutes at room temperature and baked at 120° C. for 30 minutes.

The resulting coating exhibits an attractive, intense color with excellent pearlescence, high gloss and DOI (distinctness of image).

EXAMPLE III

This example describes the application of the pigment of Example I in a metallic styling in an acrylic two coat paint system (comparative system).

The base coat paint is prepared in a similar fashion as described in Example II with the pearl base being replaced by an aluminum base. The aluminum base is obtained by mixing 456 parts aluminum paste (Sparkle Silver 5242-AR from Silberline Manufacturing) with 396 parts acrylic dispersion resin and 170 parts acrylic resin. The pigment base (80.2 parts), prepared as in Example II, is blended with 8.8 parts aluminum base and 61 parts additional resin solution (52.8% solids by weight). The application of the paint to the primed aluminum panel is carried out as described in Example II.

The coating shows an intense maroon color with excellent two tone and high gloss and DOI.

EXAMPLE IV

This example describes the durability in metallic and pearl two coat finishes of the pigment prepared in Example I and C.I. Pigment Red 224, perylene tetracarboxylic dianhydride.

Aluminum panels with an acrylic base coat/clear top coat containing C.I. Pigment Red 55 (Mn-salt) in combination with aluminum flakes (metallic styling) or iron oxide coated mica (pearl styling) are obtained as described in Examples II and III. After exposure for 2000 hours in an Atlas Weather-o-meter the following $\Delta E$-values (C.I.E.-system) vs. unexposed panels are obtained:

|  | 80:20 aluminum flake $\Delta E$ | 70:30 pearl russet $\Delta E$ |
| --- | --- | --- |
| Pigment Red 55 (formula I, $R^1$ = 4-Cl, $R^2$ = H) | 4.66 | 0.72 |
| Pigment Red 224 | 0.87 | 1.96 |

Upon outdoor exposure in Florida (8 months) similar results are obtained:

|  | 5:95 titanium dioxide $\Delta E$ | 80:20 aluminum flake $\Delta E$ | 70:30 pearl russet $\Delta E$ |
| --- | --- | --- | --- |
| Pigment Red 55 (formula I, $R^1$ = 4-Cl, $R^2$ = H) | 24.54 | 2.57 | 1.11 |
| Pigment Red 224 | 2.84 | 1.15 | 2.01 |

These data thus show the excellent durability performance of the instant compositions with coated mica (pearl finishes) as contrasted to that of the titanium dioxide and the metallized compositions.

EXAMPLE V

This example describes the durability of manganese salts of azo pigments in a two coat pearl finish.

The pigments of formula I, $R^1$=4-Cl and $R^2$=H (Pigment Red 55) and of formula I, $R^1$=4-$NO_2$ and $R^2$=H, are incorporated in an acrylic base coat/clear top coat system as described in Example II. After exposure for 1000 hours in an Atlas Weather-o-meter, the following $\Delta E$-values (C.I.E.-System) are obtained:

|  | 5:95 titanium dioxide $\Delta E$ | 80:20 aluminum flake $\Delta E$ | 70:30 pearl bronze $\Delta E$ |
| --- | --- | --- | --- |
| Pigment Red 55 (formula I, $R^1$ = 4-Cl, $R^2$ = H) | 23.65 | 2.65 | 0.84 |
| Pigment of formula I, $R^1$ = 4-$NO_2$, $R^2$ = H | 5.16 | 1.30 | 0.32 |

Both pigments of formula I are seen to exhibit excellent durability in two coat pearl stylings. In contrast, the pigments exhibit poor durability in the conventional light tint (in combination with titanium dioxide) and poor to moderate durability in metallic applications (in combination with aluminum flakes).

What is claimed is:

1. A pearlescent coating composition comprising a resin binder system selected from the group consisting of acrylic, alkyd, polyurethane, polyester and aminoplast resins, metallic oxide coated mica particles and a manganese salt of an azo pigment corresponding to the formula

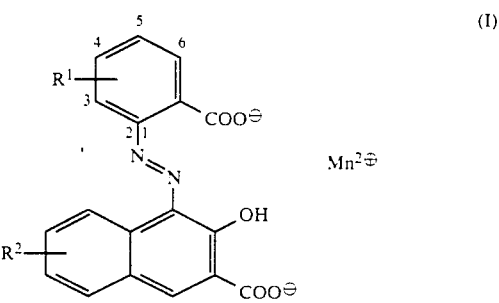

wherein $R^1$ and $R^2$, independent of each other, are hydrogen, $C_1$-$C_4$-alkoxy, halogen, nitro, cyano, $C_1$-$C_4$-alkoxycarbonyl, carbamoyl or sulfamoyl.

2. The coating composition of claim 1 wherein $R^1$ is located in the 4-position and $R^2$ is hydrogen.

3. The coating composition of claim 2 wherein $R^1$ is chloro.

4. The coating composition of claim 2 wherein $R^1$ is nitro.

5. The coating composition of claim 1 wherein the mica particles are coated with iron oxide.

6. The coating composition of claim 1 wherein the resin component of said binder system is an acrylic resin.

7. The coating composition of claim 1 having a total solids content of from about 30% to 60%.

8. The coating composition of claim 1 comprising about 0.2% to about 10% by weight of coated mica particles and about 1% to about 10% by weight of a compound of formula I.

9. The coating composition of claim 8 wherein the weight ratio of coated mica particles to the compound of formula I is between about 1:9 and about 7:3.

10. The coating composition of claim 8 comprising about 0.5% to about 5% by weight of coated mica particles and about 2% to about 7% by weight of a compound of formula I.

11. The coating composition of claim 1 comprising an acrylic resin containing binder, about 1% to about 5% by weight of iron oxide coated mica particles and about 2% to about 7% by weight of the compound of formula I wherein $R^1$ is 4-chloro or 4-nitro and $R^2$ is hydrogen.

* * * * *